(12) United States Patent
Staudinger et al.

(10) Patent No.: US 12,455,748 B2
(45) Date of Patent: Oct. 28, 2025

(54) UNIFIED MANAGEMENT INTERFACE

(71) Applicant: Redpanda Data, Inc., San Francisco, CA (US)

(72) Inventors: Moritz Staudinger, Mosbach (DE); Santiago Jimenez-Giraldo, Madrid (ES)

(73) Assignee: Redpanda Data, Inc., San Francisco, CA (US)

( * ) Notice: Subject to any disclaimer, the term of this patent is extended or adjusted under 35 U.S.C. 154(b) by 87 days.

(21) Appl. No.: 18/497,114

(22) Filed: Oct. 30, 2023

(65) Prior Publication Data

US 2024/0143352 A1 May 2, 2024

Related U.S. Application Data

(60) Provisional application No. 63/420,935, filed on Oct. 31, 2022.

(51) Int. Cl.
*G06F 3/0481* (2022.01)
*G06F 9/451* (2018.01)
*H04L 9/40* (2022.01)

(52) U.S. Cl.
CPC ............ *G06F 9/451* (2018.02); *G06F 3/0481* (2013.01); *H04L 63/08* (2013.01)

(58) Field of Classification Search
CPC ......... G06F 9/451; G06F 3/0481; H04L 63/08
See application file for complete search history.

(56) References Cited

U.S. PATENT DOCUMENTS

| | | | |
|---|---|---|---|
| 11,074,533 B1 * | 7/2021 | Upadhyay | G06Q 10/06375 |
| 2022/0382825 A1 * | 12/2022 | Koriaka | G06F 16/9577 |
| 2023/0267141 A1 * | 8/2023 | White-Sullivan | G06F 16/437 |
| | | | 707/734 |

OTHER PUBLICATIONS

Ioan-Mihail Stan et al., Enforce a global security policy for user access to clustered container systems via user namespace sharing, Dec. 11, 2020, RoEduNet Conference: Networking in Education and Research, pp. 1-6 (Year: 2020).*
Sebastian Alberternst et al., From Things into Clouds—and back, May 1, 2021, International Symposium on Cluster, Cloud and Internet Computing, pp. 668-675 (Year: 2021).*

* cited by examiner

*Primary Examiner* — Tam T Tran
(74) *Attorney, Agent, or Firm* — Young Basile Hanlon & MacFarlane, P.C.

(57) ABSTRACT

A distributed software system that includes a unified user interface. A client device receives user interface information for generating a cloud portion of a unified user interface and console interface location information for locating a console interface. The cloud interface is associated with a control plane and the console interface is associated with a data plane. The client device presents the unified user interface including the cloud portion and a user interface element associated with the console interface location information. The client device receives a user input indicating a selection of the user interface element. The client device receives console interface information for generating a console portion of the unified user interface and presents the unified user interface including the cloud portion and the console portion. The data plane is prohibited from transmitting the console portion of the unified user interface to the control plane.

20 Claims, 9 Drawing Sheets

UNIFIED MANAGEMENT INTERFACE

BACKGROUND

Organizations are increasingly making use of cloud services to store information and host distributed software applications that was previously located on the premises of the organization. In some instances, an organization can use a cloud provider to host a distributed software applications for the organization. In such instances, the organization is responsible for managing the distributed software applications and a cloud provider provides the infrastructure for executing the distributed software applications. In other instances, a cloud provider can provide the distributed software applications to the organization in what is called Software as a Service (SaaS). In such instances, a cloud provider is responsible for the managing the infrastructure and the management of the distributed software applications, while the organization provides the data and configuration information for the distributed software applications. In still other instances, an organization can use a combination of traditional on-premises distributed software applications, hosted distributed software applications, and SaaS.

SUMMARY

Disclosed herein are implementations of a method, system, and apparatus for presenting a unified user interface.

In some aspects, the techniques described herein relate to a method for presenting information in a unified user interface, the method including: receiving, at a client device, cloud interface information for generating a cloud portion of a unified user interface and console interface location information for locating a console interface, wherein the cloud interface is associated with a control plane and the console interface is associated with a data plane; presenting, at the client device, the unified user interface including the cloud portion and a user interface element associated with the console interface location information; receiving, at the client device, a user input indicating a selection of the user interface element; retrieving, by the client device from a location identified in the console user interface location information, console interface information for generating a console portion of the unified user interface; and presenting, at the client device, the unified user interface including the cloud portion and the console portion, wherein the data plane is prohibited from transmitting the console portion of the unified user interface to the control plane.

In some aspects, the techniques described herein relate to a method, further including: providing authentication information to the control plane; receiving an authentication token from the control plane responding to providing the authentication information; providing the authentication token to the data plane when retrieving console interface information for generating a console portion of the unified user interface.

In some aspects, the techniques described herein relate to a method, further including: generating, by the client device, user interface elements for tracking the navigation path of the user.

In some aspects, the techniques described herein relate to a method, wherein the console interface location information includes information for locating a second console interface associated with a second cluster different from a cluster associated with the console portion, the method further including: retrieving, by the client device from a second location identified in the console user interface location information, second console interface information for generating a second console portion of the unified user interface; and presenting, at the client device, the unified user interface including the cloud portion and the second console portion, wherein the console portion and the second console portion correspond to different version of software.

In some aspects, the techniques described herein relate to a method, wherein the console interface location information includes information for locating a second console interface associated with a second cluster different from a cluster associated with the console portion, the method further including: retrieving, by the client device from a second location identified in the console user interface location information, second console interface information for generating a second console portion of the unified user interface; and presenting, at the client device, the unified user interface including the cloud portion and the second console portion, wherein the console portion and the second console portion correspond to different software applications.

In some aspects, the techniques described herein relate to a method, wherein the data plane is located at a cloud hosting provider.

In some aspects, the techniques described herein relate to a method, wherein the data plane is located at the premises of an organization associated with the user.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
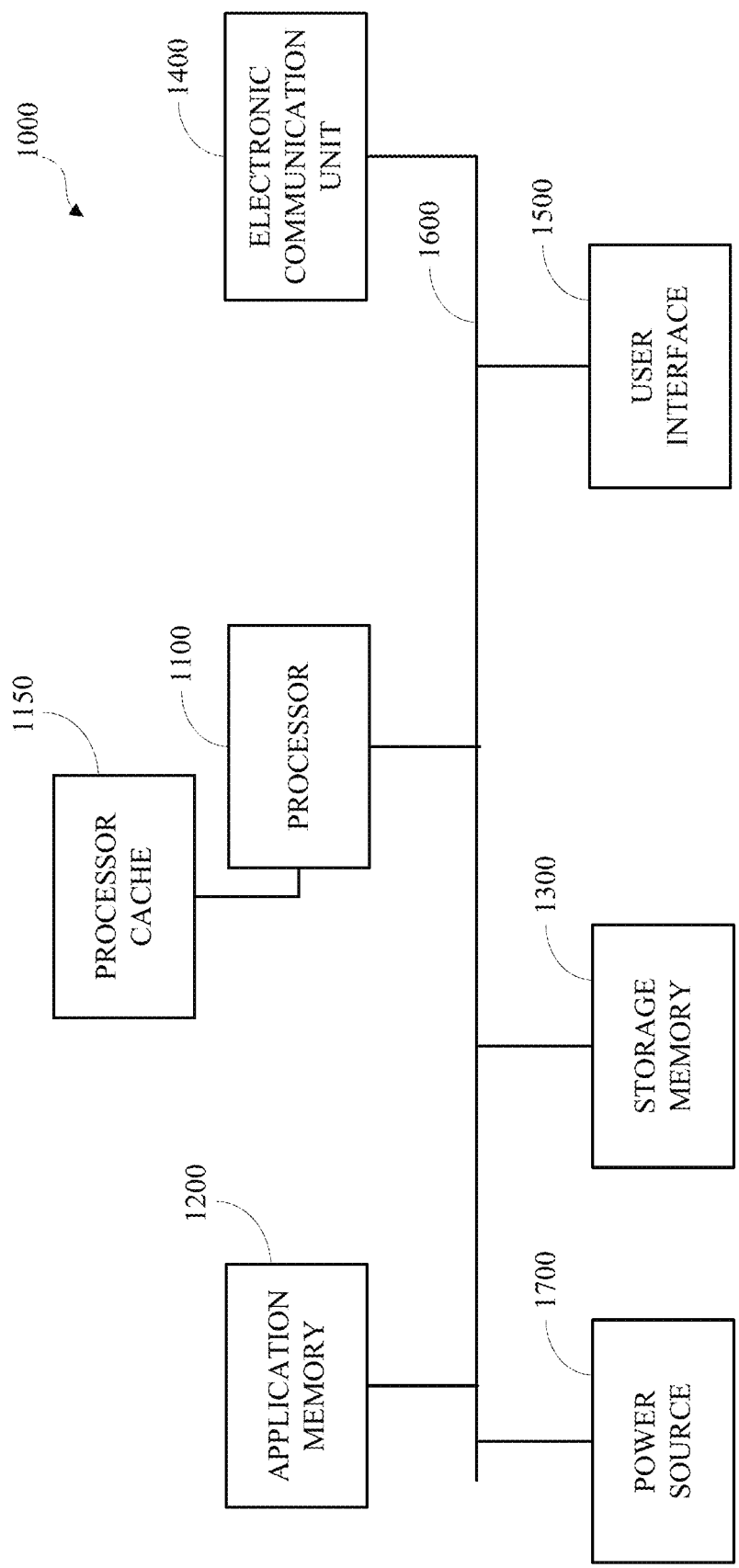
FIG. 1 is a block diagram of an example of a computing device.

Distributed software applications running on computing clusters have become a mainstay in the information technology field. In place of a single high performance computer, clusters of computers working together provide similar or greater performance than a single computer and the clusters can be scaled to meet new demands. The proliferation of distributed software applications has required new solutions in how to manage and orchestrate the clusters to increase their value. One such advance has been to partition the distributed software applications into a control plane and a data plane. At a high level, the control plane is a set of components that establish and enforce policies of the distributed software applications and the data plane is the set of components that are involved with carrying out that policy. In other words, the control plane is a stack of software that orchestrates the data plane where the actual work of the distributed software application is performed. A single control plane may orchestrate a fleet of clusters in a data plane.

Dividing the distributed software applications into a control plane and a data plane provides benefits for organizations that either use the distributed software applications or that provide the distributed software applications. For example, an organization can implement a data plane in the form of distributed software applications clusters located at their premises at multiple locations so that the clusters are physically near a data source. A separate control plane can be implemented in a centralized location to manage the distributed software application clusters in place of local management. An organization using a cloud service provider to host distributed software application can select instances physically near their data sources and manage the distributed software applications using a centralized control plane. A cloud provider offering SaaS may use a control plane to manage the allocation of computing clusters to consumers and manage the provided distributed software applications. A control plane may also be offered as SaaS to organizations to help the organization to manager their distributed software applications.

Cloud based services may provide resources to organizations that they would not otherwise have access to without a substantial investment in physical infrastructure. Additionally, cloud based services may scale easily to meet the growing demands of an organization and the organization may only need to pay for the resources that are currently required. As organizations become more reliant on cloud service providers, they may look to using multiple cloud service providers in their cloud based infrastructure. Having multiple providers provides an organization with a resilient infrastructure with redundant operations.

With more data and software services being moved to the cloud, organizations have experienced benefits in the form of increased data resiliency and redundant services. The data may be stored with multiple providers, or a providers may provide resilient data systems that are geographically distributed. However, when services are managed by a cloud provider, the increased resiliency of the organization's data and the increased redundancy comes at the cost of data being accessible to the cloud provider. In the past, an organization maintained physical possession of the hardware storing the data and knew where the data was physically located. By possessing the hardware and managing its operation, an organization had full control over the data present on its systems. With SaaS cloud services, the organization may no longer be in control of the location of the data and must rely on the security of the cloud service provider to ensure that their information is secure. For example, if a cloud service provider provides a software application to an organization as a service, that cloud provider typically will have access to the data stored by that software application. These risks can be reduced through operating policies of the cloud services provider and by using encryption and secure communication channels, but such policies systems are not infallible and they require an organization to trust that the cloud service provider is implementing its security precautions properly.

Laws, regulations, and standards may require organizations to provide different levels of security for different types of data. To ensure that a cloud service provider meets the required level of security, an organization may need to audit or otherwise ensure that the cloud service provider provides the required level of security. Each cloud service provider than an organization uses may need to be assessed to ensure that they are providing the required level of security. Thus, as an organization uses more cloud service providers, the cost of ensuring each cloud service provider provide the required level of security increases.

In addition to ensuring that the data is securely transferred to each cloud service provider and that the data is stored in a secure fashion, each time the data is accessed there is a risk of unauthorized use or disclosure of data. This risk is further compounded if the data is being accessed or passes through another cloud based application, including a cloud based control plane. For example, an information service, whether it is a local service, a cloud based service managed by an organization (e.g., a self-managed amazon web services instance) or a cloud based service managed by a cloud service provider (e.g., an amazon web services instance managed by a third party provider) may produce a stream of information that needs to be captured and processed by a data queuing system so that the information can be stored, used, and analyzed. The data queuing system receives the streams of information and queue the data, which requires that the data is stored at the data queueing system. Finally, the organization may then access the stored data and perform operations to analyze the data. If the organization is using a SaaS control plane, sensitive data might be sent to the control plane during the management of the distributed software applications.

In view of the privacy concerns and escalating costs, some organizations have opted to maintain their own distributed software applications in order to maintain control of their data or other reasons. Or the organization may want to minimize the security risks and costs by limiting the number of cloud services that their data passes through. For example, an organization may determine that the information and processing of the information should remain with the organization's infrastructure. Or an organization may use a limited number of cloud service providers and keep the information and processing of the information at the limited number of cloud service providers.

Implementations of this disclosure address problems such as these by enabling an organization to retain their information within infrastructure that they control (e.g., in an on-premises environment or in a cloud instance at a cloud hosting provider that the organization controls), but still allow a third party to provide cloud based services in a control plane infrastructure to manage and/or orchestrate distributed software applications within the organizations infrastructure. The implementations of this disclosure address the security of the information by removing the transmission of sensitive data between the organization infrastructure and the control plane infrastructure though the use of a unified user interface. The unified user interface is presented locally at a web browser of a client device associated with the organizations infrastructure and the unified UI references a local console UI provided by the organization infrastructure. The unified UI allows the user to select a local console UI for additional information about distributed software applications in the organizations infrastructure while keeping sensitive information within their infrastructure and out of the control plane.

For example, a cloud portion of the unified UI may be provided by the control plane to a web browser of a client device. The cloud portion includes information regarding the location of instances of software to be managed by the unified UI including console portions present at individual ones of the instances of software. When information relating to an instance is requested through the web browser of the client device, the console portion of the user interface is retrieved from the instance. The console portion is executed by the web browser causing it to retrieve data from the instance for display by the web browser. The web browser authenticates with the instance in a manner designed to prevent the unauthorized distribution of the console portion or the data intended for display by the web browser. The cloud portion and the console portion may, for example, be implemented using JavaScript or other scripting language to permit the creation of a seamless user interface within a single web page at the web browser.

This architecture may also permit the use of cloud and console portions having different software versions. For example, there may be multiple instances of software to be managed and some of them may have different software versions resulting in different structures of underlying data or different console portions. By generating a unified UI using the console portion provided by the software instance to be managed differences in software versions are automatically accommodated because the console portion includes both the user interface relating to the instance and also retrieves the data associated with the interface. Thus, any changes in data or operation due to version differences become irrelevant so long as the limited visual and data sharing interfaces between the cloud portion and the console portion remain compatible.

In addition to improved data security by avoiding the transfer of data from the data plane to the control plane, implementations of this disclosure may also provide benefits relating to network bandwidth and latency by limiting the transfer of data relating to the data plane to be between the data plane and the client web browser and eliminating or reducing the transfer of data (e.g., reducing use of network bandwidth and reducing latency) between the data plane and the control plane.

Additionally, implementations of this disclosure enable a user associated with the organization's infrastructure to access multiple clusters of distributed software applications using a single authentication at the control plane. Thus, the user can view and manage disparate clusters without having to manually authenticate at each cluster. Each cluster may be running different software versions and the unified UI provides a seamless experience for interacting with the clusters even when the different software versions use different communication protocols or data formatting. For example, a third party identification provider may be utilized and techniques such as JSON Web Tokens (JWT) may be utilized to enable authentication in this manner.

Another benefit provided by implementations of this disclosure is that the unified UI provides breadcrumbs for navigating between different distributed software application clusters. The breadcrumbs do not require any data to be sent back to the remote infrastructure limiting the opportunities for a malicious actor to view the activities of the user interacting with the unified UI. Instead, the console portion may be configured to communicate limited information (e.g., metadata regarding the state of the console user interface) to the cloud portion in order to permit the generation of user interface elements by the cloud portion in order to create the appearance of a single unified user interface, even though the portions come from different locations.

To describe some implementations in greater detail, reference is first made to examples of hardware and software structures used to implement the unified user interface. FIG. 1 is a block diagram of an example of a computing device 1000. One or more aspects of this disclosure, such as the client and server devices shown in FIG. 2 may be implemented using the computing device 1000. The computing device 1000 includes a processor 1100, processor cache 1150, application memory 1200, storage memory 1300, an electronic communication unit 1400, a user interface 1500, a bus 1600, and a power source 1700. Although shown as a single unit, one or more elements of the computing device 1000 may be integrated into a number of physical or logical units. For example, the processor cache 1150 and the processor 1100 may be integrated in a first physical unit and the user interface 1500 may be integrated in a second physical unit. Although not shown in FIG. 1, the computing device 1000 may include other aspects, such as an enclosure or one or more sensors.

The computing device 1000 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC.

The processor 1100 may include any device or combination of devices capable of manipulating or processing a signal or other information, including optical processors, quantum processors, molecular processors, or a combination thereof. The processor 1100 may be a central processing unit (CPU), such as a microprocessor, and may include one or more processing units, which may respectively include one or more processing cores. The processor 1100 may include multiple interconnected processors. For example, the multiple processors may be hardwired or networked, including wirelessly networked. In some implementations, the operations of the processor 1100 may be distributed across multiple physical devices or units that may be coupled directly or across a network. In some implementations, the processor 1100 may be connected to the processor cache 1150 for internal storage of operating data or instructions. For example, each core within processor 1100 may have a separate processor cache 1150 unit or may have specified memory locations allocated to it within processor cache 1150. The processor 1100 may include one or more special purpose processors, one or more digital signal processor (DSP), one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, firmware, one or more state machines, or any combination thereof.

The processor 1100 may be operatively coupled with the processor cache 1150, application memory 1200, the storage memory 1300, the electronic communication unit 1400, the user interface 1500, the bus 1600, the power source 1700, or any combination thereof. The processor may execute, which may include controlling, which may include sending to and/or receiving electronic signals from, the application memory 1200, the storage memory 1300, the electronic communication unit 1400, the user interface 1500, the bus 1600, the power source 1700, or any combination thereof. Execution may be facilitated by instructions, programs, code, applications, or the like, which may include executing one or more aspects of an operating system, and which may include executing one or more instructions to perform one or more aspects described herein, alone or in combination with one or more other processors.

The application memory 1200 is coupled to the processor 1100 via the bus 1600 and may include any storage medium with application data access including, for example, DRAM modules such as DDR SDRAM, Phase-Change Memory (PCM), flash memory, or a solid-state drive. Although shown as a single block in FIG. 1, the application memory 1200 may be implemented as multiple logical or physical units. Other configurations may be used. For example, application memory 1200, or a portion thereof, and processor 1100 may be combined, such as by using a system on a chip design.

The application memory 1200 may store executable instructions or data, such as application data for application access by the processor 1100. The executable instructions may include, for example, one or more application programs, that may be executed by the processor 1100. The executable instructions may be organized into programmable modules or algorithms, functional programs, codes, code segments, and/or combinations thereof to perform various functions described herein.

The storage memory 1300 is coupled to the processor 1100 via the bus 1600 and may include non-volatile memory, such as a disk drive, or any form of non-volatile memory capable of persistent electronic information storage, such as in the absence of an active power supply. Although shown as a single block in FIG. 1, the storage memory 1300 may be implemented as multiple logical or physical units.

The storage memory 1300 may store executable instructions or data, such as application data, an operating system, or a combination thereof, for access by the processor 1100. The executable instructions may be organized into programmable modules or algorithms, functional programs, codes, code segments, or combinations thereof to perform one or more aspects, features, or elements described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer.

The electronic communication unit 1400 is coupled to the processor 1100 via the bus 1600. The electronic communication unit 1400 may include one or more transceivers. The electronic communication unit 1400 may, for example, provide a connection or link to a network via a network interface. The network interface may be a wired network interface, such as Ethernet, or a wireless network interface. For example, the computing device 1000 may communicate with other devices via the electronic communication unit 1400 and the network interface using one or more network protocols, such as Ethernet, Transmission Control Protocol/Internet Protocol (TCP/IP), power line communication (PLC), Wi-Fi, infrared, ultra violet (UV), visible light, fiber optic, wire line, general packet radio service (GPRS), Global System for Mobile communications (GSM), code-division multiple access (CDMA), Long-Term Evolution (LTE) or other suitable protocols.

The user interface 1500 may include any unit capable of interfacing with a human user, such as a virtual or physical keypad, a touchpad, a display, a touch display, a speaker, a microphone, a video camera, a sensor, a printer, or any combination thereof. For example, a keypad can convert physical input of force applied to a key to an electrical signal that can be interpreted by computing device 1000. In another example, a display can convert electrical signals output by computing device 1000 to light. The purpose of such devices may be to permit interaction with a human user, for example by accepting input from the human user and providing output back to the human user. The user interface 1500 may include a display; a positional input device, such as a mouse, touchpad, touchscreen, or the like; a keyboard; or any other human and machine interface device. The user interface 1500 may be coupled to the processor 1100 via the bus 1600. In some implementations, the user interface 1500 can include a display, which can be a liquid crystal display (LCD), a cathode-ray tube (CRT), a light emitting diode (LED) display, an organic light emitting diode (OLED) display, an active matrix organic light emitting diode (AMOLED), or other suitable display. In some implementations, the user interface 1500 may be part of another computing device (not shown), such as in addition to or instead of being part of the computing device 1000. In some implementations, the user interface 1500 may be omitted or implemented virtually using remote access technologies via the electronic communication unit 1400.

The bus 1600 is coupled to the application memory 1200, the storage memory 1300, the electronic communication unit 1400, the user interface 1500, and the power source 1700. Although a single bus is shown in FIG. 1, the bus 1600 may include multiple buses, which may be connected, such as via bridges, controllers, or adapters.

The power source 1700 provides energy to operate the computing device 1000. The power source 1700 may be a general-purpose alternating-current (AC) electric power supply, or power supply interface, such as an interface to a household power source. In some implementations, the power source 1700 may be a single use battery or a rechargeable battery to allow the computing device 1000 to operate independently of an external power distribution system. For example, the power source 1700 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device capable of powering the computing device 1000.

Figure 2:
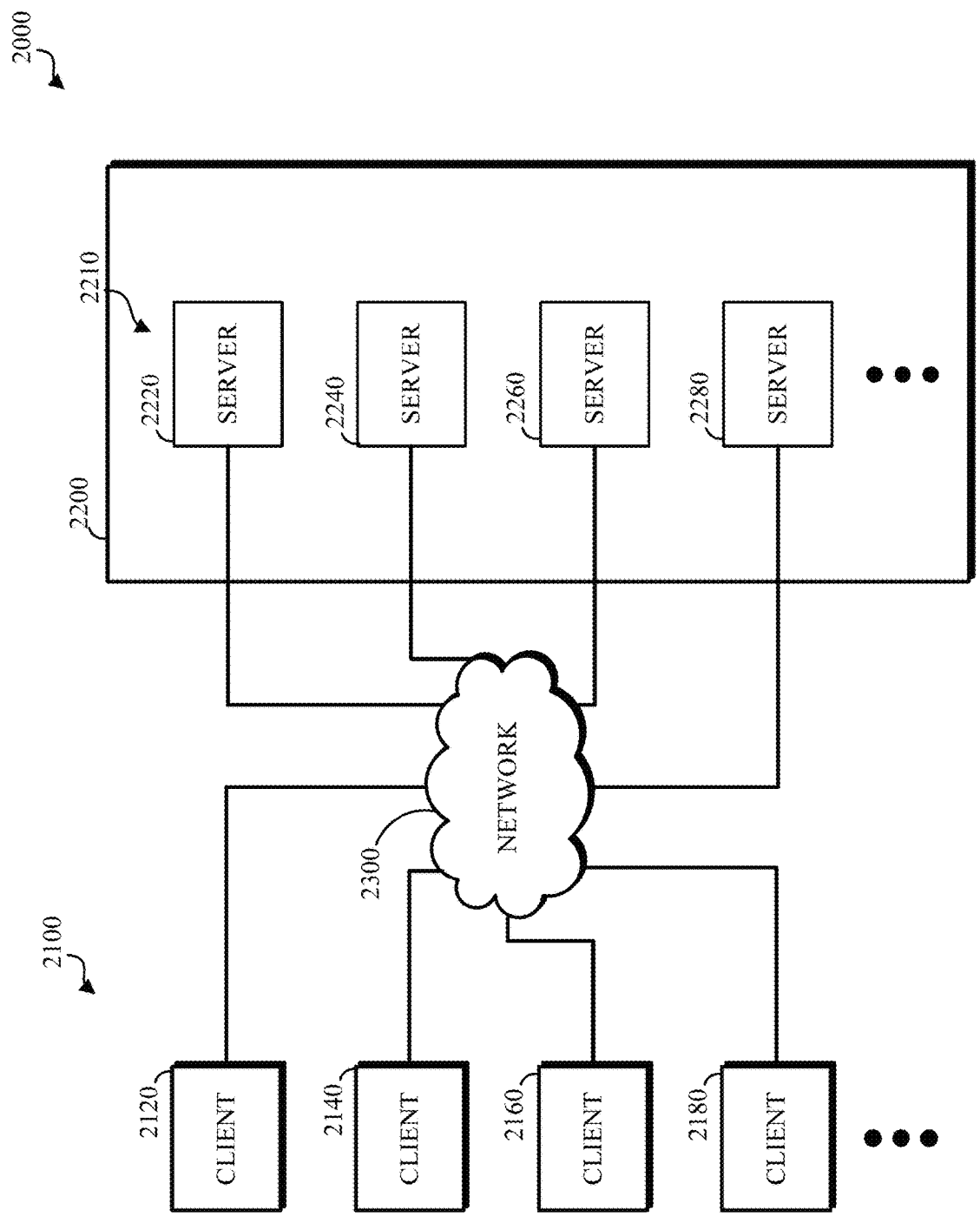
FIG. 2 is a block diagram of an example arrangement of computing devices as used in a distributed software application system.

FIG. 2 is a block diagram of an example arrangement 2000 of computing devices as used in a distributed software system 2200. The distributed software system 2200 can be a distributed software system located on the premises of an organization, a hosted distributed software system, or a SaaS system. The computing devices can include a number of client devices 2100 and a number of server devices 2210 that comprise the distributed software system 2200. As shown, there are four client devices 2120, 2140, 2160, and 2180 and four server devices 2220, 2240, 2260, and 2280. However, the number of client devices 2100 and server devices 2210 may vary depending on implementation. Additionally, each server device 2210 may be a cluster of server devices. In some instances, the distributed software system 2200 can be a geographically distributed such that each server device 2210 is located remotely from the other server devices 2210 and connected by the network. For example, a distributed software system 2200 located on the premises of an organization may have each server device 2210 located in a different geographic location where an organization has a physical presence. In another example, a hosted distributed software system 2200 may have the server devices 2210 located in different geographical regions for servicing users in the different geographical regions. Similarly, a SaaS distributed software system 2200 may locate the server devices 2210 in different geographical regions.

Each client 2100 access distributed software applications provided by the distributed software system by way of a network 2300 that communicately couples the client devices 2100 and the server devices 2210 to one another. The distributed software system 2200 can have logic for routing requests from the client devices 2100 to a specific server device 2210 for providing distributed software applications. The distributed software system 2200 can route the request based on a variety of factors such as a physical proximity of the client device 2100 and the server device 2210, guaranteed service levels for the client, client priority, and current utilization of the server devices 2210. In some instances, a server device 2210 can be dedicated to serving distributed software applications to at least one particular client 2100.

Figure 3:
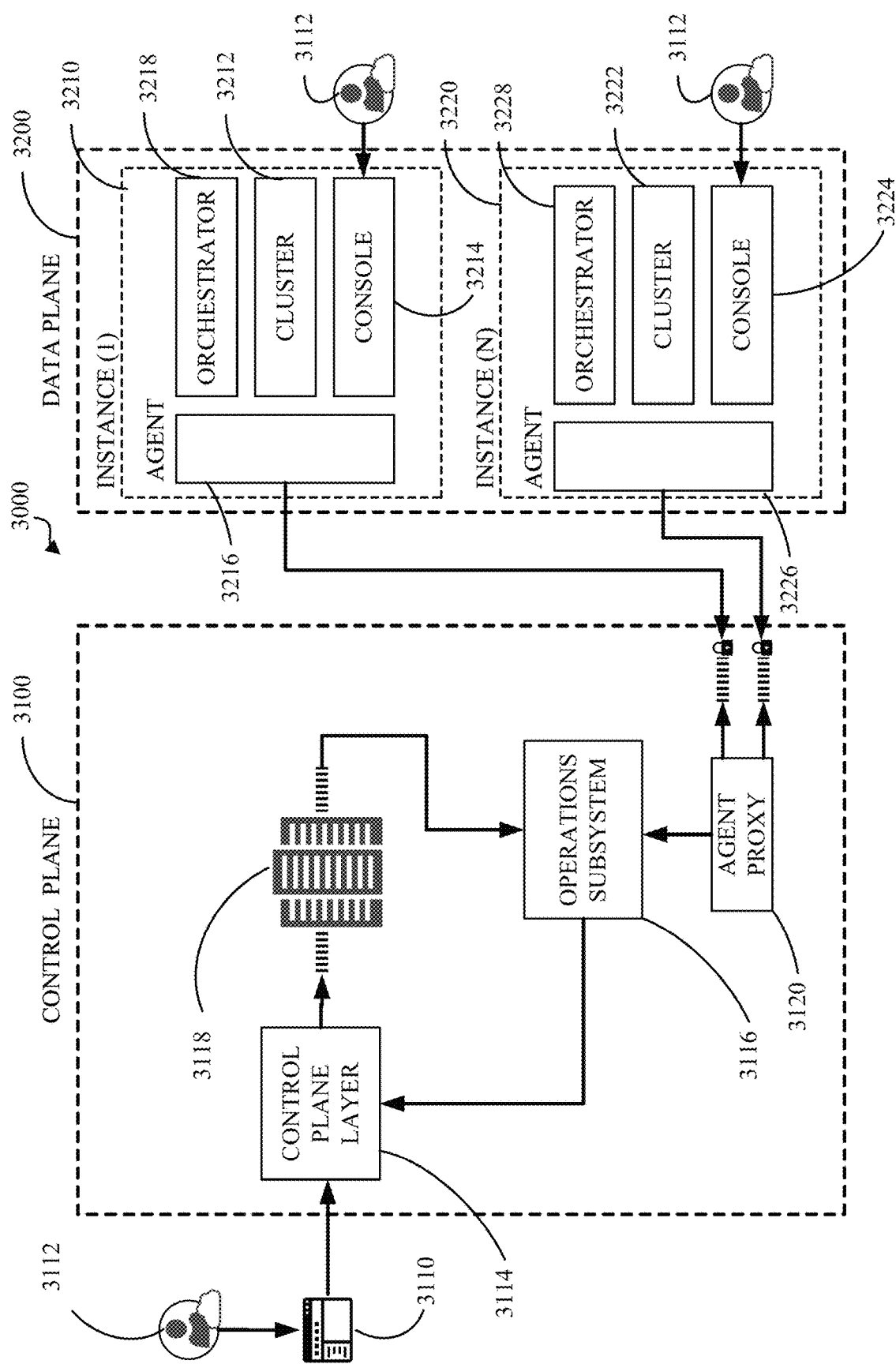
FIG. 3 is a block diagram of an example of a distributed software application system separated into a control plane and a data plane.

FIG. 3 is a block diagram of an example distributed software system 3000 including a control plane 3100 and a data plane 3200. The control plane 3100 is situated at a control infrastructure as indicated by the dashed border of the control plane 3100. The data plane 3200 is located at a data infrastructure as indicated by the dashed line border of the data plane 3200. Additionally, the data plane 3200 is divided further into a first instance 3210 and a second instance 3220 as shown by the dashed borders. Each instance may be associated with a distinct namespace.

The control infrastructure can be located on premise, hosted in the cloud, or provided by a SaaS provider. In some instances, a cloud service provider may provide the control plane 3100 as a SaaS application and implement the infrastructure shown in FIG. 3. The control plane 3100 is responsible for orchestrating clusters 3212, 3222 of distributed software applications for the instances 3210, 3220 in the data plane 3200.

The control plane 3100 includes a cloud application programming interface (API)/user interface (UI) 3110 that provides a user interface where a user 3112 can login to the control plane 3100, authenticate with the control plane 3100, create application clusters, and manage existing clusters at the data plane 3200. The user 3112 can use a single login at the control plane 3100 to manage clusters to which they have been granted access to. For example, when setting up the control plane 3100, an organization may provide the control plane 3100 with information identifying users and the instances that they should have access to. The control plane 3100 is then responsible for enforcing the restrictions of the users with respect to the instances. The control plane 3100 manages an authentication token for the user 3112 to enable the user 3112 to authenticate with a console 3214, 3224 for each instance using the authentication token. The console 3214, 3224 will be described in more detail below. The user 3112 therefore only needs to log in and authenticate with the control plane 3100 a single time for each session. Thus, even if an organization has multiple instances and clusters that each use different consoles with different user credentials, the user 3112 can use the authentication token provided by the control plane 3100 to authenticate with the other instances.

The cloud programming interface/API 3110 provides remote procedure calls to a control plane layer 3114 that manages the data plane 3200 throughout the data plane's lifecycle (from creation to deletion). The control plane layer 3114 manages the clusters 3212, 3222 in bulk, such as when upgrading a group of clusters or a group of instances. The control plane layer 3114 can save the status of a cluster in a database and reconcile the status to ensure that the status is applied in the data plane 3100. Additionally, the control plane layer 3114 provides an API for other tools to check a cluster's status, availability, and provides metadata associated with the clusters.

In some implementations, the control plane layer 3114 can monitor the database for events such as creation of a new entry, modification of an existing entry, and deletion of an existing entry. When the control plane layer 3114 detects an event, it can produce a message for further processing by an operations subsystem 3116. In some implementations the events may be produced as a stream and a queueing application 3118 can manage and organize the messages before passing them to the operation subsystem 3116.

The operations subsystem 3116 consumes the message produced by the control plane layer 3114 and processes the messages by solving tasks necessary to implement the database event. For example, a database event may indicate that a cluster should be upgraded from one version to another. The operation subsystem 3116 can process the message and break it up into tasks for accomplishing the cluster upgrade. The operations subsystem 3116 may trigger a task to push the upgrade to the particular cluster in the data plane 3200, monitor the status of the cluster to verify that it reports back the new version, and generate other tasks depending on if the cluster reports back the new version or if a different status is reported. The operation subsystem 3116 can monitor the status of the cluster based on status reports of the data plane 3200 and may generate any tasks necessary to ensure that the status of the cluster is consistent with the desired status as provided in the database.

An agent proxy 3120 provides a gateway for communication between the control plane 3100 and the data plane 3200. The agent proxy also provides for an authentication between the control plane 3100 and the data plane 3200. In some instances, the agent proxy 3120 can inform an instance of an authentication token provided to the user 3112 of the unified UI to enable the user to access a console without requiring additional authentication. The agent proxy 3120 also receives authentication information from the agent 3226 to verify the identity of the instances.

Each instance 3210, 3220 of the data plane 3200 can include an agent 3216, 3226 for communicating with the control plane 3100, an orchestrator 3218, 3228 for managing the clusters 3212, 3222, and the console 3214, 3224 providing a console UI for the user 3112 to interact with the instances 3210, 3220.

The agent 3216, 3226 provides a gateway for each instance 3210, 3220 to communicate with the control plane 3100 and manages operations sent from control plane 3100 to manage the instances 3210, 3220. The agent 3216, 3226 processes cluster specifications sent from the control plane 3100 and can initiate cluster updates and other operations. The agent 3216, 3226 is the only component within the data plane 3200 that should communicate with the control plane 3100.

The orchestrator 3218, 3228 deploys and manages the clusters 3212, 3222 of an instance 3210, 3220 inside the data plane 3200. For example, the agent 3216, 3226 and the console are tools for managing the clusters 3212, 3222, but the orchestrator 3218, 3228 is the component that actually performs the operations for the clusters 3212, 3222. In other words, when the agent 3216, 3226 initiates an update or an operation is performed by the user with the console 3224, the orchestrator 3218, 3228 receives a message from the agent 3226 or console 3224 and executes the operation for the cluster 3212, 3222. The orchestrator 3218, 3228 applies changes to the clusters 3212, 3222 as needed to ensure the clusters 3212, 3222 maintain the desired state.

The console 3214, 3224 provides a UI that the user 3112 can use to interact with the cluster 3212, 3222 inside of the data plane 3200. Each instance 3210, 3220 can implement its own console 3214, 3224 for interacting with the cluster 3212, 3222 and each console 3214, 3224 may provide a different UI depending on the distributed software applications provided by the cluster 3212, 3222. For example, a console 3214, 3224 for a queuing distributed software application would have an different user interface than a cluster 3212, 3222 providing a database distributed software application. Furthermore, the consoles 3214, 3224 can have different authentication techniques for the user 3112 interacting with the console 3214, 3224 including different user credentials.

As will be described in more details in relation to FIG. 4, a cloud UI provides a centralized UI for the user 3112 to interact with all of the instances 3210, 3220. However, each instance 3210, 3220 may contain sensitive data that the control plane 3100 should not be allowed to access. Therefore, the cloud UI is designed to not route information through the control plane 3100 when presenting the UI.

To accomplish a unified UI that provides centralized access to each of the instances 3210, 3220 in the data plane 3200, the unified UI integrates the console UI with the cloud UI. The unified UI references the location of the console UI, but does not transmit the console UI outside of the data plane 3200. Additionally, since the user 3112 authenticates with the control plane 3100 and receives an authentication token for accessing the consoles 3214, 3224, the consoles 3214, 3224 can present the console UI without requiring additional authentication by the user 3112.

Figure 4:
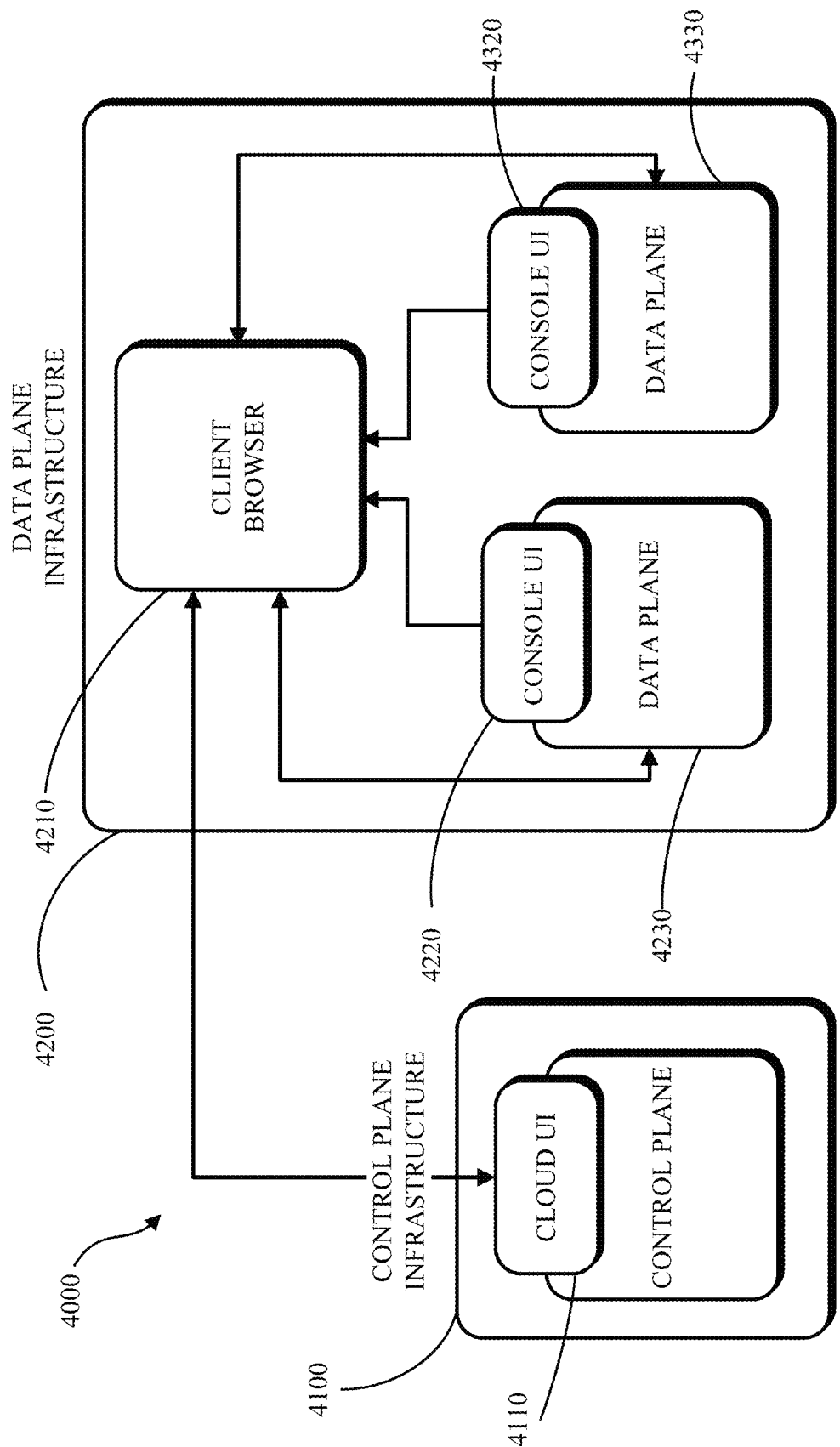
FIG. 4 is a block diagram of an example a distributed software application system configured to present a unified user interface.

FIG. 4 is a conceptual block diagram of a distributed software service 4000 showing an information flow and separation of a control plane infrastructure 4100 and a data plane infrastructure 4200 when implementing a unified UI. The control plane infrastructure 4100 and the data plane infrastructure 4200 do not communicate with one another except for through the agent proxy 3120 and the agents 3216, 3226 as described in relation to FIG. 3. The data plane infrastructure shown in FIG. 4 includes a first data plane 4230 having a first console UI 4220 and a second data plane 4330 having a second console UI 4320. Each console UI 4220, 4320 is a UI to a console at the respective data plane 4230, 4330. Each console UI 4220, 4320 may have a different software version and do not need to be the same as one another. For example, each console UI 4220, 4320 can have a different software version number, interact with a different type of cluster, or have a different visual theme or formatting. In the following description, the unified UI will be described in relation to the first console UI 4220, but the description applies to the second console UI 4320 and any other console UI that exists in the data plan infrastructure.

In the example of FIG. 4, a client browser 4210 is shown as being located within the data plane infrastructure 4200. In some instances, access to an instance's console UI may be restricted to local networks within the data plane infrastructure 4200 to prevent outside parties from accessing the console UI. However, in some instances, an organization may allow the console UI to be accessed external to the data plane infrastructure 4200 and the client browser 4210 may be connected to a network external to the data plane infrastructure 4200. In some examples, the client browser 4210 may be located outside of the data plane infrastructure 4200, but implement a secure tunnelling protocol to tunnel into the data plane infrastructure 4200 to access the console UI.

The client browser 4210 requests the unified UI while it is located at a location that has access to the first console UI 4220, such as from within the data plane infrastructure 4200. The control plane responds to the request by sending information for presenting the cloud UI 4110 to the client browser 4210. The information includes information for interacting with the cloud UI 4110 such as controls for authentication, creating clusters, and managing clusters, and also includes console interface location information for locating the first console UI 4220 and the second console UI 4320 at the data plane infrastructure 4200. The console UI location information may be a uniform resource locator (URL) or other information for retrieving the console UIs 4220, 4320. Additionally, the cloud UI 4110 may include metadata information for the console such as a description of the instance.

The client browser 4210 loads the cloud UI 4110 and the client browser 4210 presents the cloud UI 4110 including a cloud portion of a unified UI and a user interface element representing a console UI. The UI element includes a hyper link referencing the console interface location information. A user may interact with the cloud UI to perform regular management functions provided by the control infrastructure. If the user wants to interact with the data plane, the user can select or open the UI element to load the console UI. The client browser 4210 loads the first console UI 4220 based on the uniform resource locator provided by the cloud UI. Of note, the client browser 4210 can open the first console UI 4220 without sending any information to the control plane infrastructure 4100 indicating that the console UI 4220 is being loaded. Furthermore, information from the first console UI 4220 is never transmitted through the control plane infrastructure 4100 and is transmitted directly to the client browser 4210.

The client browser 4210 can present a seamless experience, where the user is unable to discern a difference between when the user is viewing data generated by the cloud UI or data generated by a console UI. Furthermore, because the cloud UI does not interact with the console UI, there is no need for the console UI to conform to a standard format for compatibility with the cloud UI 4110. The unified UI can load console UIs 4220 having different versions, different UI elements, and related to different software services. The unified UI may generate breadcrumb tracking data to assist a user in navigating between different instances, different sections of the console interface, and returning to the cloud UI. For example, breadcrumbs may be displayed in the unified UI in a manner designed to identify past actions (e.g., a navigation path).

Figure 5:
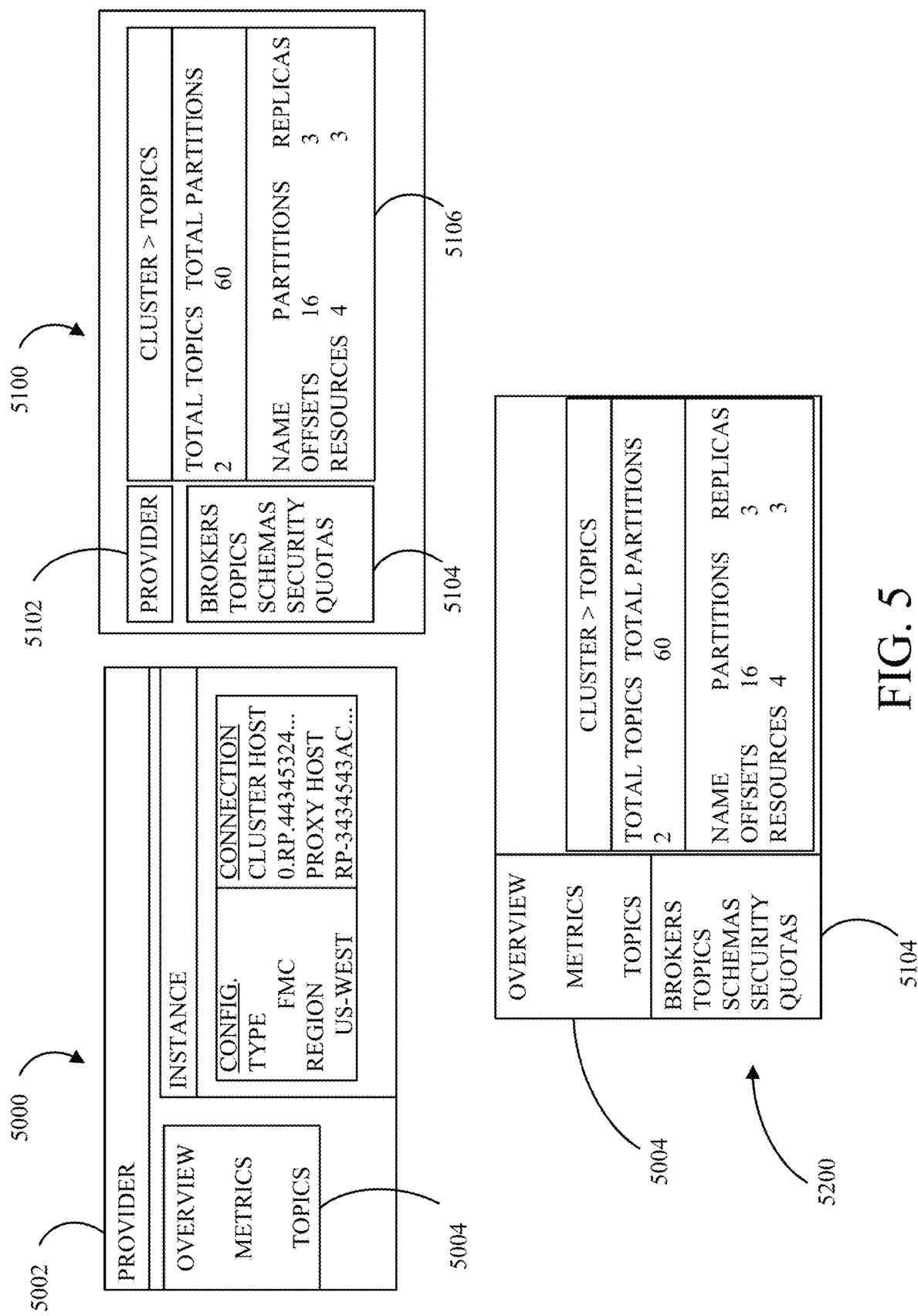
FIG. 5 is an illustration of a cloud user interface and a console user interface being combined into a unified user interface.

FIG. 5 illustrates a simplified block diagram of the combination of a cloud UI 5000 and a console UI 5100 to generate a unified UI 5200. Cloud UI 5000 is an example implementation of cloud UI 4110 and console UI 5100 is an example implementation of console UI 4220, 4320. The cloud UI 5000 includes a branding information field 5002 of the control plane provider that includes information such as the name of the control plane provider, a logo, or other branding information. Below the branding information field is a navigation field 5004 for navigating to different pages of the cloud UI 5000. To the right of the navigation field 5004 is an information field 5006 providing information about distributed computing instances such as the general configuration, the type, the region, and a URL for connecting to the instance. The information provided at the cloud UI is general information about the distributed computing instances and should not contain any sensitive information.

The console UI includes a branding information field 5102 similar to the branding information field of 5002 of the cloud UI. The console UI includes a navigation field 5104 for navigating to different pages of the console UI 5100. In contrast to the navigation field of the cloud UI, the navigation field of the console UI provides access to pages that may contain sensitive information. For example, the console UI 5100 is currently showing an information field 5106 related to cluster topics, which may contain sensitive information about the information being processed by the cluster.

The unified UI combines the cloud UI and the console UI to present a unified UI that includes the information from the cloud UI and the information from the console UI, but keeps them separate so that the sensitive data of the console UI is never sent to the cloud UI. For example, the unified UI includes the navigation pane of the cloud UI for navigating to the different cloud UI pages and includes the navigation pane of the console UI for navigating to the console UI pages. Thus, the unified UI allows the user to navigate between the cloud UI and the console UI without needing to leave the cloud UI to access the console UI. The implementation of the unified Ui will be described in more detail in relation to FIGS. 6-8 which show various views of the unified UI.

Figure 6:
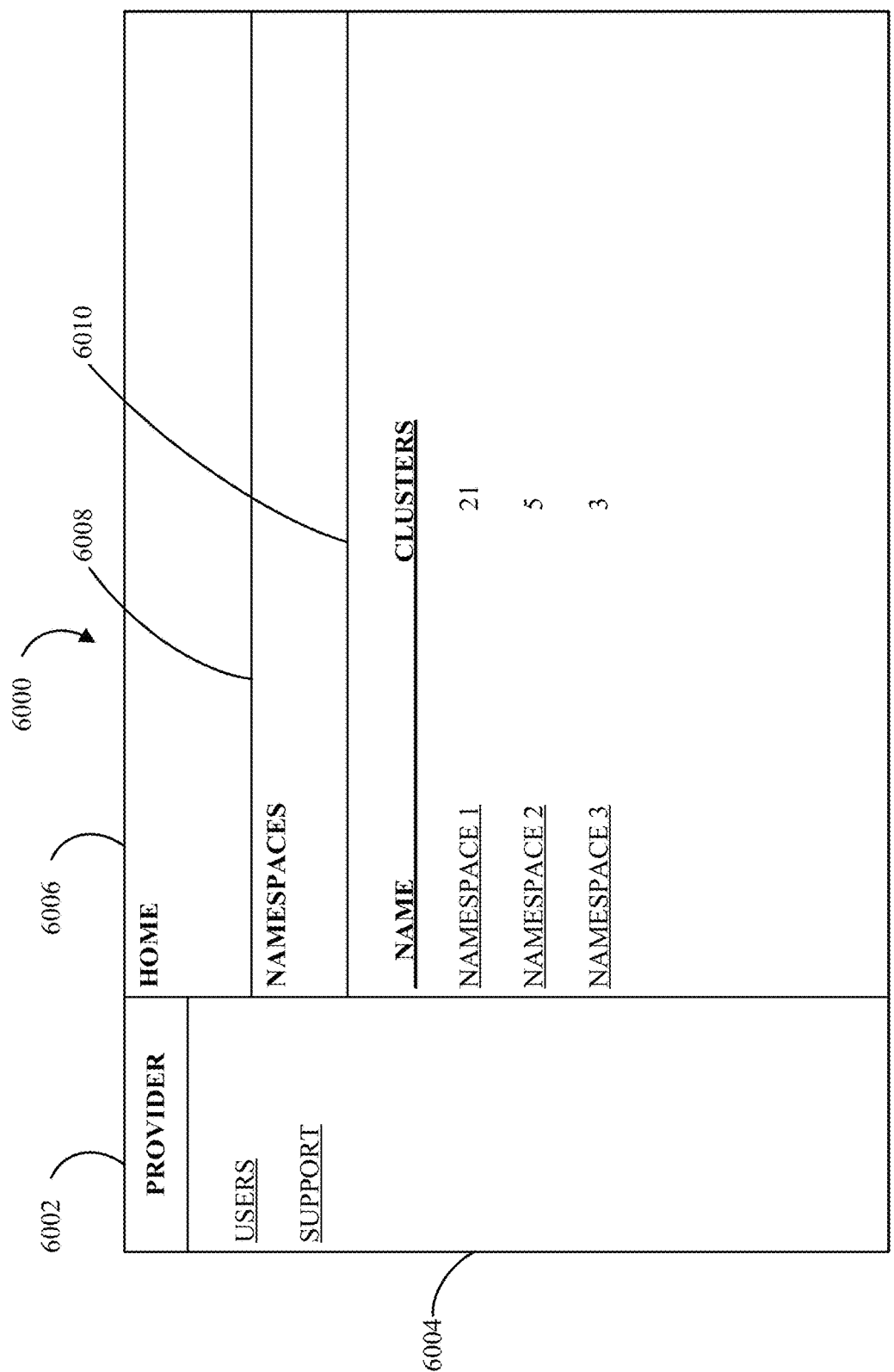
FIGS. 6-8 are illustrations of a unified user interface.

FIG. 6 is a simplified block diagram of a unified UI 6000 that may be presented to a user of a browser when loading the unified UI 6000. Unified UI 6000 is an example implementation of a unified UI as previously described. The unified UI 6000 of FIG. 6 assumes that the user has already been authenticated by the cloud API of the control plane. The unified UI 6000 includes a branding information field 6002 as described previously in relation to FIG. 5, a navigation field 6004 for navigating the unified UI 6000, a bread crumb field 6006 illustrating how the user arrived at the page they are currently viewing, an identification field 6008 identifying the information contained in an information field 6010, and the information field 6010 containing content being presented in the unified UI 6000.

The navigation field 6004 includes user interface elements that reference pages associated with the unified UI 6000. In this instance, since the user is at a start page and has not loaded a console UI, the user interface elements reference pages that are provided by the cloud UI of the control plane. For example, the "USERS" UI element provides a reference to the location of a page for managing the users of the control plane. The "SUPPORT" UI element references the location of a page containing support information for the control plane. Each of these pages are served by the UI API of the control plane.

The bread crumb field 6006 identifies how the user arrived at the page currently presented to the user by the web browser. Since the page presented in FIG. 6 is the page displayed when a user initially loads the unified UI 6000, the bread crumb field 6006 shows a single reference to "HOME", which is the currently displayed page.

The identification field 6008 identifies information is being presented in the information field 6010. In this example, the identification field 6008 identifies that the information field 6010 provides a list of name spaces that the user can access. Each name space may be a name space of a instance of a distributed software service. The information field 6010 lists the namespaces and the number of clusters associated with each name space. Each name space may implement a different distributed software application or distributed software application version. This information is known to the control plane as the control plane is responsible for instantiating the different instances and managing their general operation. Therefore, this information is not sensitive and is service by the cloud UI of the control plane.

Each namespace shown in the information field 6010 is a user interface element that references a location, such as a URL, of the console UI for that namespace. This information is provided by the control plane at the time the page is served to the browser. A user can select one of the user interface elements to enter the console UI of that namespace. For example, in response to selecting the user interface element "NAMESPACE 3," the web browser requests the console UI from the location referenced by the user interface element and the web browser presents a portion of the console UI associated with the namespace, as shown in FIG. 7.

Figure 7:
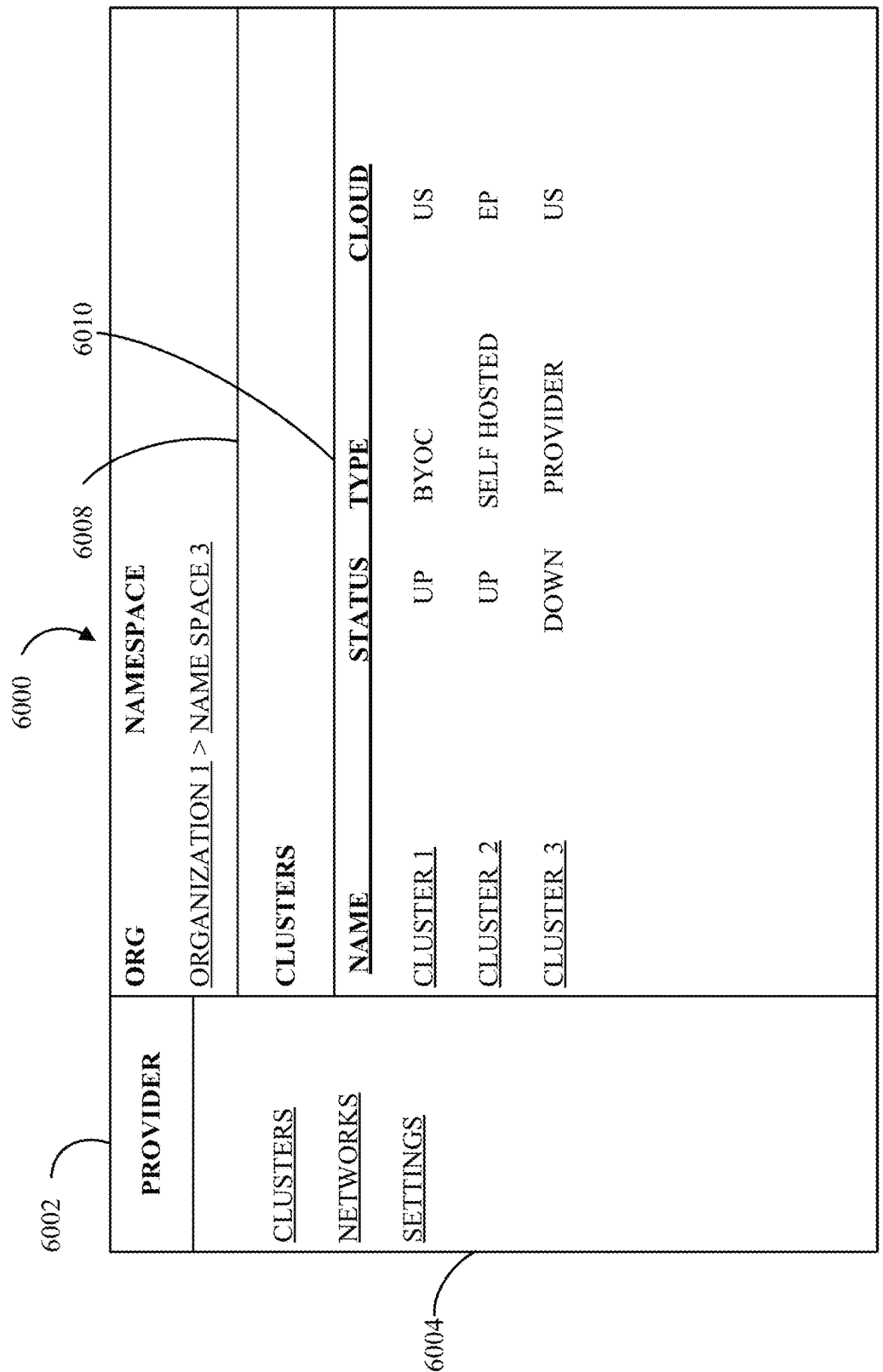

FIG. 7 is an simplified block diagram of the unified UI 6000 after a user has selected the "NAMESPACE 3" user interface element. The web browser requests the console UI from the location referenced in the UI element and displays portion of the console UI in the unified UI 6000. The change in requesting the pages from the control plane to the data plane is seamless and the unified UI does not distinguish which portions of the unified UI are from the cloud UI and which portions are from the console UI. In some instances, the console UI may use a different style than that the unified UI. In such instances, a user may be able to distinguish between the cloud Ui and the console UI since they may use different fonts, colors, or icons. In some implementations, the unified UI can translate the UI elements of the console UI to maintain a common theme between the disparate UIs.

The integrated UI as displayed in FIG. 7 is now specific to namespace 3 since the console for namespace 3 is serving the content. For example, the navigation field 6004 now displays user interface elements specific to the namespace and the bread crumb field 6006 shows that the user is now at a page associated with namespace 3. The identification field 6008 shows that the information field 6010 is displaying information about the clusters that are available at namespace 3. The information field 6010 includes information identifying each cluster, the status of the cluster, the type of cluster, and what cloud the cluster is running on. This information may be private information that the organization associated with the namespace does not want to share with the control plane provider. Because the information is loaded directly from the console, the control plane provider is unable to view the information. Additionally, since the control plane previously provided the web browser with an authentication token for accessing each console as part of the authentication process, the user does not need to enter any new authentication information when changing from pages associated with the cloud UI and pages associated with the console UI, even if the user has different credentials at the console UI. Furthermore, because the cloud UI manages the credentials, the user is able to access all instances that they are authorized to access using the token provided by the cloud UI, even if each instance normally requires different credentials.

Figure 8:
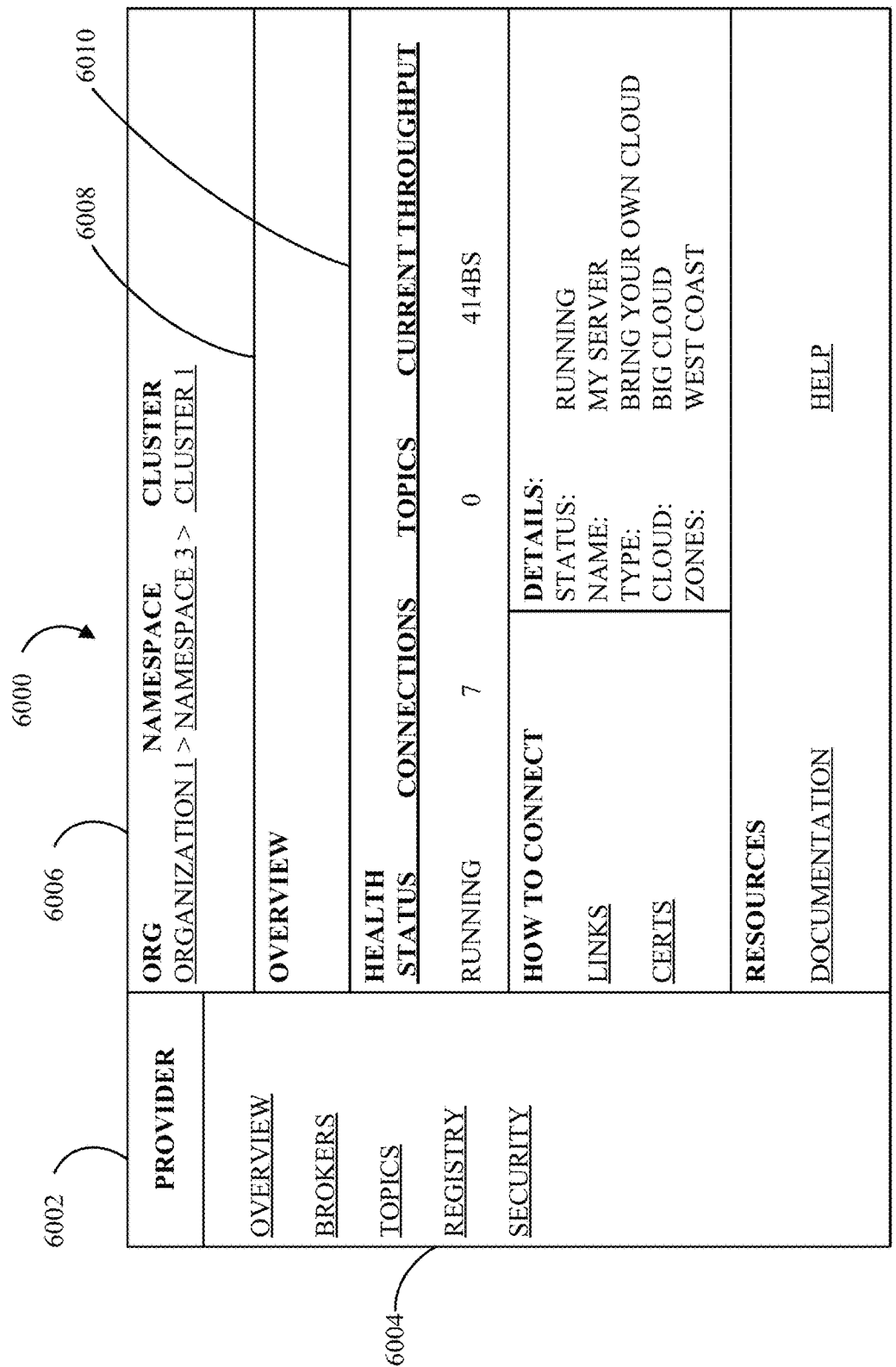

FIG. 8 is a simplified block diagram of the unified UI 6000 after the user have selected a user interface element corresponding to the "FIRST CLUSTER". The navigation field 6004 now shows user interface elements referencing pages that are specific to that cluster, such as an overview, brokers, topics, a registry, and security information. The user interface elements are provided by the console UI and, as such, will vary depending on the type of distributed software service being managed. The example shown in FIG. 8 is specific to a data queuing software service, but implementations of the disclosure are suitable for use with other software services.

The bread crumb field 6006 now shows that the user accessed the current page by selecting "NAMESPACE 3" and then "CLUSTER 1". The identification field 6008 shows that the current page is an overview of the cluster. The information field 6010 shows cluster information such as the health of the cluster, how many connections the cluster has, and the current throughput of the cluster. Other information is provided such as how to connect to the cluster and further details about the cluster.

Figure 9:
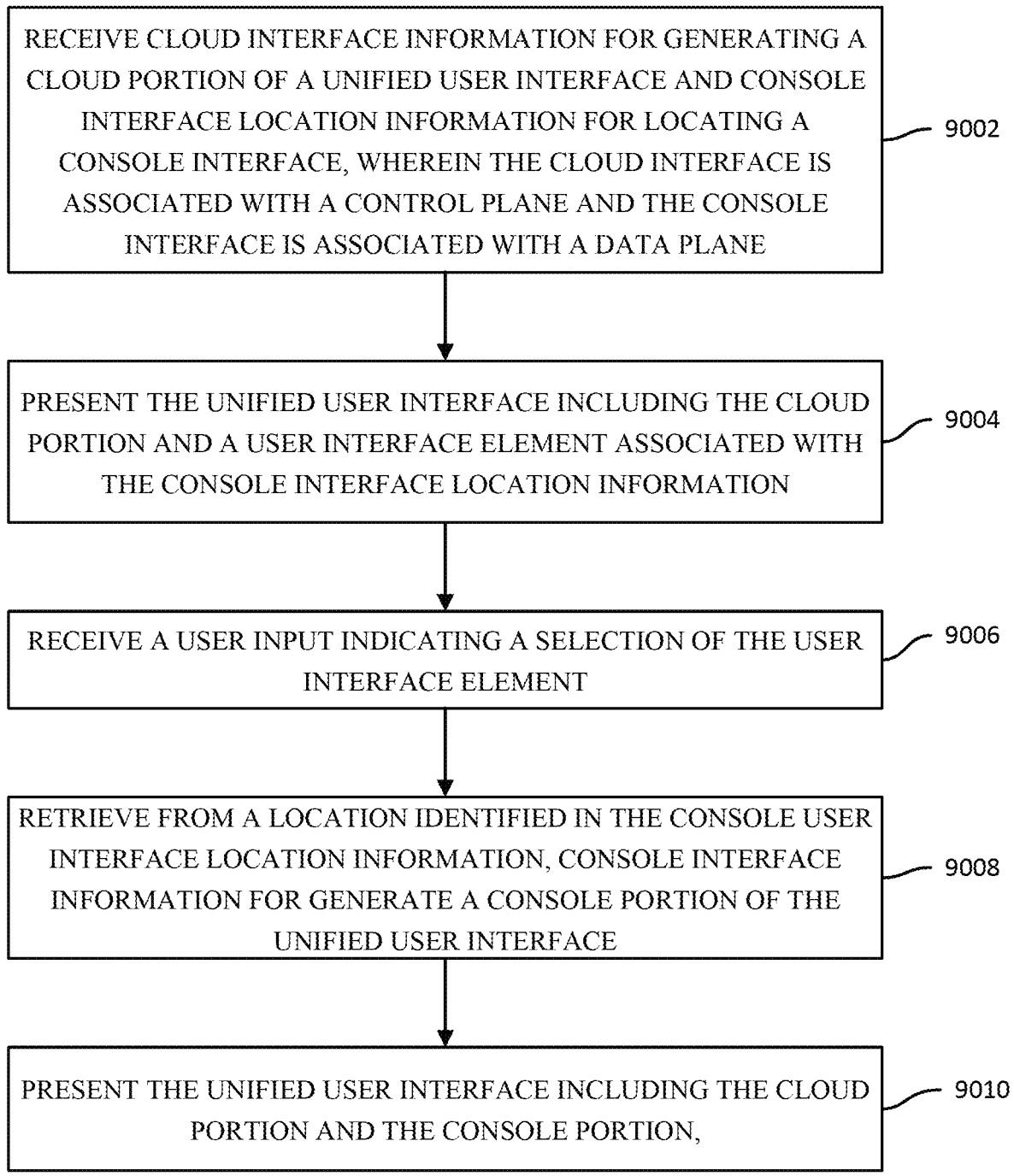
FIG. 9 is a block diagram of a technique for presenting a unified user interface.

To further describe some implementations in greater detail, reference is next made to examples of techniques which may be performed by or using a distributed software system having a unified UI. FIG. 9 is a flowchart of an example of a technique 9000 presenting a unified user interface. The technique 9000 can be executed using computing devices, such as the systems, hardware, and software described with respect to 1-8. The technique 9000 can be performed, for example, by executing a machine-readable program or other computer-executable instructions, such as routines, instructions, programs, or other code. The steps, or operations, of the technique 9000 or another technique, method, process, or algorithm described in connection with the implementations disclosed herein can be implemented directly in hardware, firmware, software executed by hardware, circuitry, or a combination thereof.

For simplicity of explanation, the technique 9000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 9002, cloud interface information for generating a cloud portion of a unified user interface and console interface location information for locating a console interface is received. The cloud interface is associated with a control plane and the console interface is associated with a data plane. For example, a user may request the user interface shown in FIG. 6.

At 9004, the unified user interface including the cloud portion and a user interface element associated with the console interface location information is presented. For example, the user interface of FIG. 6 is presented showing cloud portions and a user interface element in the information field 6010 that include references to locations for accessing a console.

At 9006, a user input indicating a selection of the user interface element is received. For example, a user could select "NAMESPACE 3" in the information field of FIG. 6.

At 9008, console interface information for generating a console portion of the unified user interface is retrieved from a location identified in the console user interface location information. For example, information can be retrieved from a console identified by in the console user interface location information.

At 9010, the unified user interface including the cloud portion and the console portion, is presented. For example, FIG. 7 shows a console portion associated with namespace 3 being presented.

The technique can be performed with the data plane being prohibited from transmitting the console portion of the unified user interface to the control plane.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a non-transitory computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for presenting information in a unified user interface, the method comprising:
receiving, at a client device, cloud interface information for generating a cloud portion of the unified user interface and console interface location information for locating a console interface, wherein the cloud interface information is associated with a control plane and the console interface location information is associated with a data plane;

presenting, at the client device, the unified user interface including the cloud portion and a first user interface element associated with the console interface location information;

receiving, at the client device, a user input indicating a selection of the first user interface element;

retrieving, by the client device from a location identified in the console interface location information, console interface information for generating a console portion of the unified user interface without transmitting the console portion to the control plane; and presenting, at the client device, the unified user interface including the cloud portion and the console portion.

2. The method of claim 1, further comprising:
providing authentication information to the control plane;
receiving an authentication token from the control plane responding to providing the authentication information; and
providing the authentication token to the data plane when retrieving console interface information for generating the console portion of the unified user interface.

3. The method of claim 1, further comprising:
generating, by the client device, second user interface elements for tracking a navigation path of a user.

4. The method of claim 1, wherein the console interface location information includes information for locating a second console interface associated with a second cluster different from a cluster associated with the console portion, the method further comprising:
retrieving, by the client device from a second location identified in the console interface location information, second console interface information for generating a second console portion of the unified user interface; and
presenting, at the client device, the unified user interface including the cloud portion and the second console portion,
wherein the console portion and the second console portion correspond to different version of software.

5. The method of claim 1, wherein the console interface location information includes information for locating a second console interface associated with a second cluster different from a cluster associated with the console portion, the method further comprising:
retrieving, by the client device from a second location identified in the console interface location information, second console interface information for generating a second console portion of the unified user interface; and
presenting, at the client device, the unified user interface including the cloud portion and the second console portion,
wherein the console portion and the second console portion correspond to different software applications.

6. The method of claim 1, wherein the data plane is located at a cloud hosting provider.

7. The method of claim 1, wherein the data plane is located at a premises of an organization associated with a user.

8. A non-transitory computer-readable medium including instructions that when executed by a processor of a client device cause the client device to:
receive, at the client device, cloud interface information for generating a cloud portion of a unified user interface and console interface location information for locating a console interface, wherein the cloud interface information is associated with a control plane and the console interface location information is associated with a data plane;

present, at the client device, the unified user interface including the cloud portion and a first user interface element associated with the console interface location information;

receive, at the client device, a user input indicating a selection of the first user interface element;

retrieve, by the client device from a location identified in the console interface location information, console interface information for generating a console portion of the unified user interface without transmitting the console portion to the control plane; and present, at the client device, the unified user interface including the cloud portion and the console portion.

9. The non-transitory computer-readable medium of claim 8, further comprising instructions to:
provide authentication information to the control plane;
receive an authentication token from the control plane responding to providing the authentication information; and
provide the authentication token to the data plane when retrieving console interface information for generating the console portion of the unified user interface.

10. The non-transitory computer-readable medium of claim 8, further comprising instructions to:
generate, by the client device, second user interface elements for tracking a navigation path of a user.

11. The non-transitory computer-readable medium of claim 8, wherein the console interface location information includes information for locating a second console interface associated with a second cluster different from a cluster associated with the console portion, the non-transitory computer-readable medium further comprising instructions to:
retrieve, by the client device from a second location identified in the console interface location information, second console interface information for generating a second console portion of the unified user interface; and
present, at the client device, the unified user interface including the cloud portion and the second console portion,
wherein the console portion and the second console portion correspond to different version of software.

12. The non-transitory computer-readable medium of claim 8, wherein the console interface location information includes information for locating a second console interface associated with a second cluster different from a cluster associated with the console portion, the non-transitory computer-readable medium further comprising instructions to:
retrieve, by the client device from a second location identified in the console interface location information, second console interface information for generating a second console portion of the unified user interface; and
present, at the client device, the unified user interface including the cloud portion and the second console portion,
wherein the console portion and the second console portion correspond to different software applications.

13. The non-transitory computer-readable medium of claim 8, wherein the data plane is located at a cloud hosting provider.

14. The non-transitory computer-readable medium of claim 8, wherein the data plane is located at a premises of an organization associated with a user.

15. An apparatus comprising a memory and a processor configured to:
   receive, at a client device, cloud interface information for generating a cloud portion of a unified user interface and console interface location information for locating a console interface, wherein the cloud interface information is associated with a control plane and the console interface location information is associated with a data plane;
   present, at the client device, the unified user interface including the cloud portion and a first user interface element associated with the console interface location information;
   receive, at the client device, a user input indicating a selection of the first user interface element;
   retrieve, by the client device from a location identified in the console interface location information, console interface information for generating a console portion of the unified user interface without transmitting the console portion to the control plane; and
   present, at the client device, the unified user interface including the cloud portion and the console portion.

16. The apparatus of claim 15, further configured to:
   provide authentication information to the control plane;
   receive an authentication token from the control plane responding to providing the authentication information; and
   provide the authentication token to the data plane when retrieving console interface information for generating the console portion of the unified user interface.

17. The apparatus of claim 15, further configured to:
   generate, by the client device, second user interface elements for tracking a navigation path of a user.

18. The apparatus of claim 15, wherein the console interface location information includes information for locating a second console interface associated with a second cluster different from a cluster associated with the console portion, the apparatus further configured to:
   retrieve, by the client device from a second location identified in the console interface location information, second console interface information for generating a second console portion of the unified user interface; and
   present, at the client device, the unified user interface including the cloud portion and the second console portion,
   wherein the console portion and the second console portion correspond to different version of software.

19. The apparatus of claim 15, wherein the console interface location information includes information for locating a second console interface associated with a second cluster different from a cluster associated with the console portion, the apparatus further configured to:
   retrieve, by the client device from a second location identified in the console interface location information, second console interface information for generating a second console portion of the unified user interface; and
   present, at the client device, the unified user interface including the cloud portion and the second console portion,
   wherein the console portion and the second console portion correspond to different software applications.

20. The apparatus of claim 15, wherein the data plane is located at a cloud hosting provider.

* * * * *